United States Patent
Bouzar

(10) Patent No.: US 7,656,424 B2
(45) Date of Patent: Feb. 2, 2010

(54) METHOD AND DEVICE FOR STABILIZING IMAGES SUPPLIED BY A VIDEO CAMERA

(75) Inventor: Salah Bouzar, Sceaux (FR)

(73) Assignee: Citilog, Paris (FR)

(*) Notice: Subject to any disclaimer, the term of this patent is extended or adjusted under 35 U.S.C. 154(b) by 330 days.

(21) Appl. No.: 11/661,982

(22) PCT Filed: Aug. 11, 2005

(86) PCT No.: PCT/FR2005/002071
§ 371 (c)(1),
(2), (4) Date: Mar. 6, 2007

(87) PCT Pub. No.: WO2006/030080
PCT Pub. Date: Mar. 23, 2006

(65) Prior Publication Data
US 2007/0263096 A1    Nov. 15, 2007

(30) Foreign Application Priority Data
Sep. 8, 2004    (FR) .................................. 04 09480

(51) Int. Cl.
H04N 7/18    (2006.01)
H04N 5/225    (2006.01)
G06K 9/00    (2006.01)

(52) U.S. Cl. .................. 348/149; 348/143; 348/148; 348/169; 382/103; 382/104

(58) Field of Classification Search .............. None
See application file for complete search history.

(56) References Cited
U.S. PATENT DOCUMENTS
5,099,323 A * 3/1992 Morimura et al. ...... 348/207.99

(Continued)

FOREIGN PATENT DOCUMENTS
JP    2002 218444    8/2002

OTHER PUBLICATIONS

Marcenaro L et al: "Image stabilization alogorithms for video-surveillance applications" Proceedings 2001 International Conference on Image Processing. ICIP 2001. Thessaloniki, Greece, Oct. 7-10, 2001, International Conference on Image Processing, New York, NY: IEEE, US vol. vol. 1 of 3. Conf. 8, Oct. 7, 2001, pp. 349-352, XP010564868.

Primary Examiner—Sinh Tran
Assistant Examiner—Wanda M Negron
(74) Attorney, Agent, or Firm—Young & Thompson

(57) ABSTRACT

Method and device for stabilizing images obtained by a video camera of an environment with objects moving along lanes. The method a first stage of determining in first images obtained by the camera, portions corresponding to the movement lanes, determining the remaining second portions complementary to the first portions, determining, in the second portions, the reference position of the image point corresponding to a first stationary object point, and a second stage of determining in at least one second image taken after the first images, the vector that corresponds to the movement of the image point relative to its reference position determined by the first images, and processing the second image as a function of the modulus and direction of the vector such that, relative to the three-dimensional frame of reference the image point returns to its reference position.

5 Claims, 2 Drawing Sheets

U.S. PATENT DOCUMENTS

| | | | |
|---|---|---|---|
| 5,157,732 A * | 10/1992 | Ishii et al. | 382/107 |
| 5,596,365 A * | 1/1997 | Erickson et al. | 348/208.4 |
| 5,847,755 A | 12/1998 | Wixson et al. | |
| 6,760,061 B1 * | 7/2004 | Glier et al. | 348/149 |
| 7,053,962 B1 * | 5/2006 | Engelsberg | 348/699 |
| 2004/0027454 A1 * | 2/2004 | Vella et al. | 348/155 |
| 2004/0131233 A1 * | 7/2004 | Comaniciu et al. | 382/104 |
| 2005/0163348 A1 * | 7/2005 | Chen | 382/107 |

* cited by examiner

METHOD AND DEVICE FOR STABILIZING IMAGES SUPPLIED BY A VIDEO CAMERA

The present invention relates to methods of stabilizing images obtained by a video camera of an environment that is associated with a given three-dimensional frame of reference and in which objects can move along preferred lanes, in particular in a particularly advantageous application, the invention relates to all kinds of road traffic control, e.g. monitoring vehicle speeds and/or the spacing between vehicles, and also detecting incidents, accidents, etc. . . . .

Cameras viewing road traffic are generally secured to poles. The poles that are used most often are those provided for public lighting or pylons for radio transmissions or the like. Use is also made of concrete supports secured to a structure to be kept under surveillance, etc.

Under all circumstances, such supports can be subjected to various types of deformation that can change the orientation of cameras' fields of view. Experience shows that two types of deformation are encountered the most often, in particular with roads: deformation due to temperature gradient and deformation due to vibration.

More particularly when the pole is made of metal, a large temperature gradient can arise between its two faces when one of them is heated by the sun, thereby giving rise to a twisting couple between those two faces leading to deformation of the pole consisting in its top to perform turning movement in rotation relative to its foot, thus causing the camera to move, albeit very slowly.

In contrast, the vibration caused by factors such as wind or vehicles passing over the structure, in particular a viaduct, a bridge, etc., lead to movements of the line of sight of the camera that are very fast.

Unfortunately, algorithms for detecting incidents or measuring traffic, that are known in themselves, work on the assumption that the images come from cameras that are stationary, i.e. that have a position that is permanent in a given frame of reference. They operate essentially on the principle that consists in taking measurements of objects, such as vehicles, moving against a background that is stationary, e.g. a road, and in analyzing the result of those measurements in order to issue various orders or alarms.

For a long time, the Applicant has been commercializing products based on such algorithms, e.g. the products that have the commercial reference "Media road, media tunnel".

Those algorithms operate in successive steps, that are essentially as follows:
- dynamically constructing a mean reference image of stationary objects;
- comparing said image with the current image in order to find moving objects; and
- analyzing the moving objects to measure their speed, displacement, density, etc.

The first step thus consists in retaining, in an image, only objects that are stationary (road, trees, buildings, hoardings, etc.). All measurements performed subsequently are based on that image. Thus, an error made by making that image can have consequences on the accuracy of the desired result, and that can be very harmful when measuring road traffic, in particular it can lead to a false alarm being issued or to an incident not being detected.

Such an error is usually caused by the vibration to which the camera is subjected, and that has the consequence of destabilizing image processing, which assumes that the images are stationary whereas they are not. It is therefore clear that if no compensation of vibration is performed, the risks run for automatically detecting incidents by video are numerous, and in particular:
- difficulty for the road network operator who needs to monitor traffic on the network by viewing sequences of images, particularly if the images are compressed. A non-negligible loss of quality is then observed;
- reduction in the rate at which incidents or the like are detected and an increase in the rate at which false alarms are generated; and
- an increase in the number of systematic errors inherent to any measurement system.

It is therefore necessary to attempt to keep the image stationary at the input of the system for automatically analyzing the images.

At least two solutions are already known.

The first consists in canceling the effect of vibration by means of a mechanical system integrated in the camera. Such devices are very rare in the trade and very expensive.

The second consists in processing the image output by the camera. The image issued by the camera is corrected initially by an algorithm that stabilizes it to cancel the vibratory effect, and it is then analyzed by the usual algorithm. However the presently known correction methods are used very little because they are very complex and lead to costs, in particular in terms of hardware comprising processors and memories, that are too great for those methods to be usable on an industrial scale.

In addition, previously-known methods of stabilizing an image are in fact applicable only when the camera is subjected to vibration, or rather pseudo-instabilities, that are voluntary, for example due to changes in focus during a zoom effect or to the camera being swiveled in order to aim at a more particular point of the environment under inspection.

In order to correct such pseudo-instabilities, the method consists essentially in manual calibration by selecting the address of a stationary point directly in the image, e.g. corresponding to an object point forming part of a building. That address is then stored and used to stabilize the images, but only providing the camera is stationary and is not subjected to changes of focus or direction, whether voluntary or otherwise.

However that method cannot be implemented when the camera is subjected to oscillatory vibration of the kind described above.

An object of the present invention is thus to implement a method of stabilizing the images obtained on the focal target of a video camera of an environment that has a given three-dimensional frame of reference associated therewith in which objects can move along preferred lanes, and that mitigates to a large extent the above-mentioned drawbacks of prior art methods.

More precisely, the present invention provides a method of stabilizing images obtained by a controllable video camera of an environment that has a given three-dimensional frame of reference associated therewith and in which objects can move on preferred lanes, the method being characterized in that it consists:
- in a first stage:
  - in determining, in relatively stable first images obtained by the controllable camera, first portions that correspond to the preferred movement lanes for said objects; then
  - in determining in said first images, by a differential process, remaining second portions that are complementary to the first portions; and then in determining, in said remaining second portions, the reference position of the image point corresponding to a first stationary object point belonging to said environment, said first stationary object point having brightness different from the brightness of the zone of the environment that surrounds it; and in a second stage following the first:

in determining in at least one second image taken by the controllable camera after said first images, the vector corresponding to the movement of said image point relative to its reference position determined with said first images; and in processing the second image output by the controllable camera as a function of the modulus and the direction of said vector in such a manner that relative to said three-dimensional frame of reference associated with the environment, said image point returns to its reference position.

Other characteristics and advantages of the invention appear from the following description given with reference to the non-limiting and illustrative accompanying drawings, in which.

Initially, it is specified that in the figures the same references designate the same elements regardless of the figure in which they appear and regardless of the way in which said elements are shown. Similarly, if elements are not specifically referenced in one of the figures, their references can easily be discovered by referring to another figure.

It is also specified that when in the definition of the invention, the subject matter of the invention is stated to comprise "at least one" element having some given function, the embodiments described may have a plurality of such elements. Conversely, if the embodiments of the subject matter of the invention as shown have a plurality of elements that are identical in function, and if in the description it is not specified that the subject matter of the invention must necessarily have some particular number of those elements, then the subject matter of the invention may be defined as comprising "at least one" of those elements.

Finally, it is specified that when, in the present description, an expression defined on its own, without any special mention relating thereto, a set of structural characteristics [e.g. $\Sigma=\Sigma(\rho, \tau, \epsilon, \ldots)$], when defining the subject matter of the applied-for protection, those characteristics may be taken, where technically possible, either separately [e.g. $\epsilon$, and/or $\tau$, and/or $\rho, \ldots$] or in a complete or partial combination [e.g. $\Sigma(\epsilon, \tau, \rho)$, and/or $\Sigma(\tau, \rho)$, and/or $\Sigma(\epsilon, \rho)$]

As mentioned in the introduction of the present description, there exist systems for vehicle traffic surveillance by means of controllable video cameras. Video cameras of this type are well known in themselves and are not described in greater detail herein in order to simplify the present description.

Such surveillance systems are based essentially on processing images by means of specific algorithms. The Applicant has already put on the market an example that is known under the commercial reference "Media road, media tunnel".

Such systems serve automatically to detect in particular incidents or accidents on traffic lanes, and to draw appropriate consequences therefrom, in particular for the purpose of reducing the time required to intervene, in particular for emergence services. They also enable other functions to be performed, e.g. verifying vehicle speeds, gaps between vehicles, detecting tailbacks, etc.

Figures 1, 2:
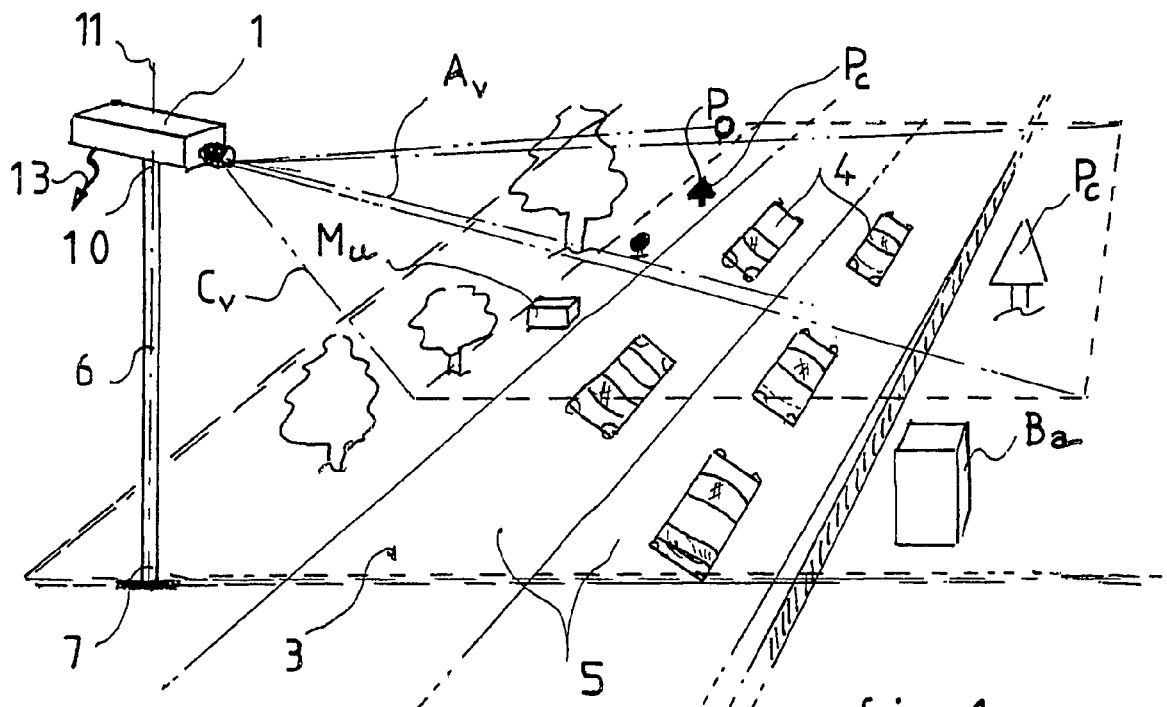
FIG. 1 is a diagram for explaining the method of the invention, showing by way of example a controllable video camera situated at the top of a pole for surveillance of an environment in which objects can move, such as motor vehicles or the like on traffic lanes.
FIG. 2 shows in highly diagrammatic manner the problems that can arise with a controllable video-camera situated at the top of a pole, which problems can be solved by implementing the method of the invention.

In general, and as shown in FIG. 1, in order to perform these functions, the field of view $C_v$ of such a controllable camera must be capable of covering an environment of relatively large area in order to cover the entire traffic zone that is to be monitored, and even to monitor beyond that zone, for reasons of safety.

FIG. 1 shows a controllable camera 1 having a field of view $C_v$ suitable for filming a portion of an environment 3 in which objects 4 such as motor vehicles or the like can move on traffic lanes 5. In order to enable the camera 1 to film the relatively large area of such an environment 3 properly, and produce images that are of use, it is generally located at the top of a pole 6 so as to look down on the environment 3, with the height of the pole possibly being 10 meters or more, like those that are situated beside motorways or the like.

These poles are usually specially designed to support such a camera, i.e. they are as rigid as possible. However, more generally, in order to minimize costs, the poles used may be pre-existing posts, e.g. such as those used for supporting public lighting or the like.

Nevertheless, whatever the structure of such a pole, they are all the subject of vibration, for example due to the passage of heavy vehicles and/or gusts of wind, and they are also the subject of deformation.

FIG. 2 shows in highly diagrammatic form such a pole 6 carrying a controllable camera 1 at its top. Such a pole may be subjected to oscillating motion in rotation, referred to below as vibration, having a center that may be considered as being situated substantially at the foot 7 of the pole 6 and lying within a cone having a solid angle 8 at the apex. As a result, the camera 1 can move over a spherical cap 9 that is substantially centered on the foot 7 of the pole.

It should firstly be observed in this figure that the amplitude 8 of the vibration of the pole 6 relative to its length is greatly exaggerated so as to show more clearly the drawbacks of a camera situated at the top 10 of such a pole 6 and the movements to which it can be subjected.

Under such conditions, and relative to the environment 3 that the camera is to film, the camera can be subjected to random movements that can be resolved and described firstly as two freedoms in rotation substantially about the foot 7, respectively in two orthogonal planes, one substantially containing the line of sight $A_x$ (or optical axis) of the camera, i.e. rotation perpendicular to the plane of the figure, and the other being substantially perpendicular to said line of sight, i.e. rotation in the plane of the figure.

Given also that the amplitude 8 of the vibration is relatively small compared with the height of the pole 6, the spherical cap 9 can be approximated by a plane that is tangential to the top 10 of the pole.

There is a third possible degree of freedom in rotation, that about the axis 11 of the pole 6. However, in practice, this third possible degree of freedom is relatively infrequent and almost non-existent, since the wind resistance of the camera is of the same order of magnitude as that of the pole. It can therefore be ignored compared with the other two degrees of freedom in rotation.

Finally, the camera can be subjected to movement having a fourth degree of freedom, i.e. movement in translation along the axis 11 of the pole 6, e.g. caused by thermal expansion. Such movement is slow compared with movement in the other degrees of freedom, but not negligible.

Under such conditions, when the pole is subjected to random oscillatory motion in rotation, given that the environment 3 is stationary and that it is the camera that is moving relative thereto and thus relative to the frame of reference associated therewith, such as, for example, on land, a Galilean frame of reference, the controllable camera delivers images that change because its line of sight is moving relative to the environment, and this change can be considered as being movement relative to the camera.

Thus, when the camera moves in the plane perpendicular to its line of sight, and/or along the axis 11 of the pole, the movement of the images it delivers can be considered as movement in translation, as is demonstrated below.

In contrast, when the camera moves in a plane containing its line of sight, the images are subjected to an effect known to the person skilled in the art as "zoom", or mathematically as scaling. Under such circumstances, given that the objects filmed by such a camera can be considered optically as situated at infinity, the "zoom" effect on the images formed by the camera for an amplitude 8 in oscillation rotation of the pole 6 has very little influence on the size of the images. In general, this type of deformation can therefore be ignored and the images can be considered as being stable.

From the above, it can be seen that the instability in the images given by a controllable video camera 1 situated at the top 10 of a pole 6 is essentially and solely due to rotation of the camera in a plane substantially perpendicular to its line of sight or optical axis $A_v$, which rotation can be considered as being movement in translation.

Consequently, since detecting incidents or accidents on a traffic lane is based on analyzing the images output by the camera, and since for this detection to be reliable it is necessary for the images to be as stable as possible, the object of the invention is to implement a method of automatically stabilizing the images output by the controllable video camera when it is subject to oscillating motion in rotation or vibration and/or movement in translation as explained above, which method is implemented upstream from the input to the system for automatically analyzing the images.

The method of the invention serves to stabilize the images obtained by a controllable video camera 1 of an environment 3 with which there is associated a given three-dimensional frame of reference, e.g. a Galilean frame of reference, in which objects 4 such as motor vehicles or the like can move along preferred lanes 5.

The method consists, in a first stage, in determining in relatively stable first images of the environment 3 obtained by the camera 1, first portions 21 corresponding to the preferred travel lanes 5 of said objects, e.g. motor vehicles 4, and then in determining, in these first images, by using a differential process that is well known in itself to the person skilled in the art, the remaining second portions 22 that are complementary to the first portions 21, and then in determining, in said remaining second portions 22, the reference position of the image point $P_i$ corresponding to a first stationary object point $P_o$ belonging to the environment 3, but situated off the preferred travel lanes 5 of the objects 4, said first stationary object point $P_o$ presenting brightness that is different from the zone of the environment 3 that surrounds it.

Figure 3:
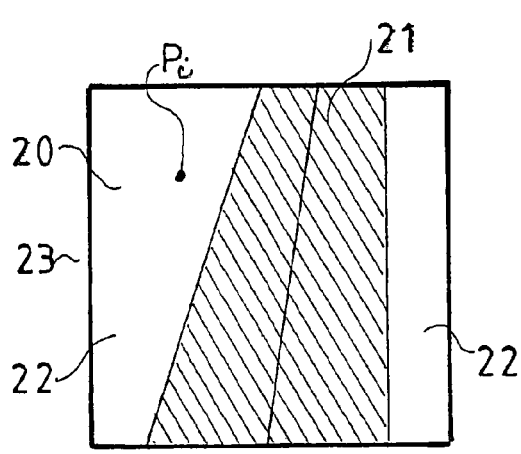
FIGS. 3 to 5 are respectively three successive views of the environment shown in FIG. 1 as obtained at the output from the controllable video camera, for explaining the various steps of the method.

By way of illustration, FIG. 3 shows one of the first images 20 taken by the stationary camera 1 of the environment 3 which is shown diagrammatically in FIG. 1. By way of example, this representation shows what might be seen on a video screen, of outline 23 drawn in bold continuous lines, and as applied to the input of an automatic image analysis system shown diagrammatically at 60 in FIG. 6 that is described below.

The stationary object point $P_o$ may be constituted, for example, by a traffic or advertising panel Pc, or a portion thereof as shown diagrammatically in FIG. 1, or else a portion of a wall Mu, of a building Ba, etc., which by definition generally presents brightness that is different from the surrounding zone of the environment.

Nevertheless, and preferably, the stationary object point $P_o$ is selected, whenever possible, as being on the horizon line, since it is then almost certain that it appears to be stationary in the image from the camera and that it presents without any doubt brightness that is different from the brightness of the surrounding zone of the environment.

Thereafter, in a second stage following the first, the method consists in determining, in at least one second image 30 taken after the first images 20 while the controllable camera 1 is liable to be subjected to vibration, the vector $V_d$ corresponding to the displacement of the image point $P_{ib}$ relative to its reference position $P_i$ determined with the first images 20 and stored in a memory at the end of the first stage, and in processing the second image 30 from the output 13 of the camera by servo-control as a function of the modulus and the direction of the vector $V_d$ so that relative to the frame of reference associated with the environment 3, the image point $P_{ib}$ returns to its reference position $P_i$ and the image 30 as processed in this way ends up producing an image 40 that is stationary relative to the frame of reference associated with the environment 3, i.e. so as to obtain in general manner images that are stabilized prior to being applied to the input of the system 60 for automatically analyzing images.

This servo-control processing of the signal delivered by the camera 1 can be implemented by means of an electronic processing member that may be integrated in the camera housing, or preferably in the housing at the inlet of the monitoring system, e.g. a system of the type as mentioned above. The processor member may be constituted by a programmed computer.

Figure 4:
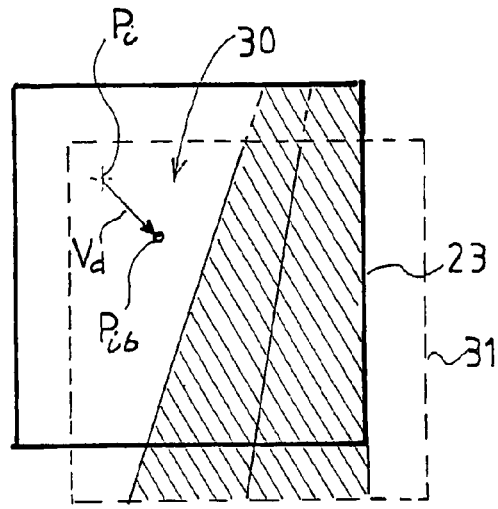

By way of illustrative example, FIG. 4 shows a second image 30 of the environment 3 shown in FIG. 1, taken by the camera 1 after it has been subjected to a movement as defined above. By way of example, this representation shows what could have been seen on a video screen of outline 23, still drawn as bold continuous lines and that would, and in the absence of the correction obtained by the method of the invention being applied to the input of the image analysis system, as mentioned above.

The dashed-line outline 31 in FIG. 4 shows the image that the camera would have delivered at its output 13 if it had not been subjected to any parasitic vibratory movement.

Figure 5:
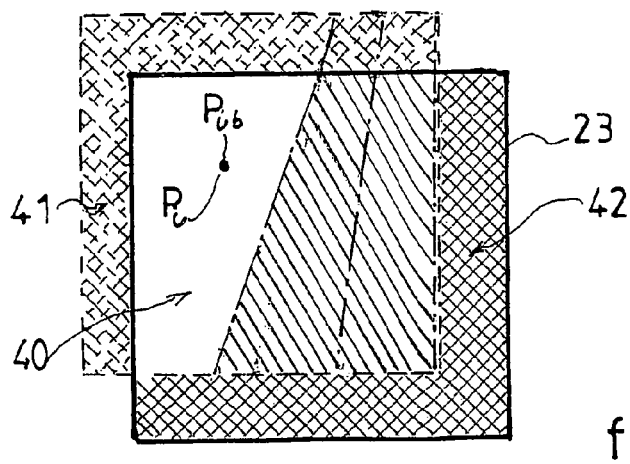

FIG. 5 shows a final image 40 obtained at the output 13 of the controllable camera 1 after the second image 30 has been processed and as could be seen on the video screen whose outline 23 is still drawn in bold continuous lines.

This final image 40 corresponds to the image 30 of FIG. 4 after being processed by the above-defined method, after being subjected to a servo-control "correcting relative movement" along a vector opposite to the above-defined vector $V_d$, thus enabling the image point $P_{ib}$ in the image 30 to be brought back to the reference location $P_i$ (FIGS. 3 and 5) where it would have been found if the camera had not been subjected to any vibration.

It is then clear, that as a result of this movement in translation, the final image 40 output from the controllable camera 1, in comparison with the first image 20 (FIG. 3) has lost a portion of its area, i.e. the portion 41 that is cross-hatched in discontinuous lines, and that in addition it is missing a portion, specifically the portion 42 cross-hatched in continuous lines which, e.g. on the video screen, is generally displayed in black or the like, this being characteristic of a portion of the image being absent.

Naturally, in FIG. 5, the amplitude of the correcting relative movement of the image taken by the camera on being subjected to vibration and the areas of the two surface portions 41 and 42 that are lost and absent, are greatly exaggerated, solely for the purpose of showing more clearly the result that is obtained by implementing the last step of the second stage of the method of the invention.

In practice, these surface portions 41 and 42 are of areas that are not large enough to interfere with the image processing as performed using methods known in the prior art in order, for example, to detect incidents or accidents on traffic lanes, as implemented in the product already commercialized by the Applicant under the reference "Media road DAI".

It should be observed that the second image 30 forms part of the images taken by the camera after all of the operations provided for the first stage of the method have been accomplished, since vitiation can occur at any time and it is necessary at all times to correct the images given by the camera.

Figure 6:
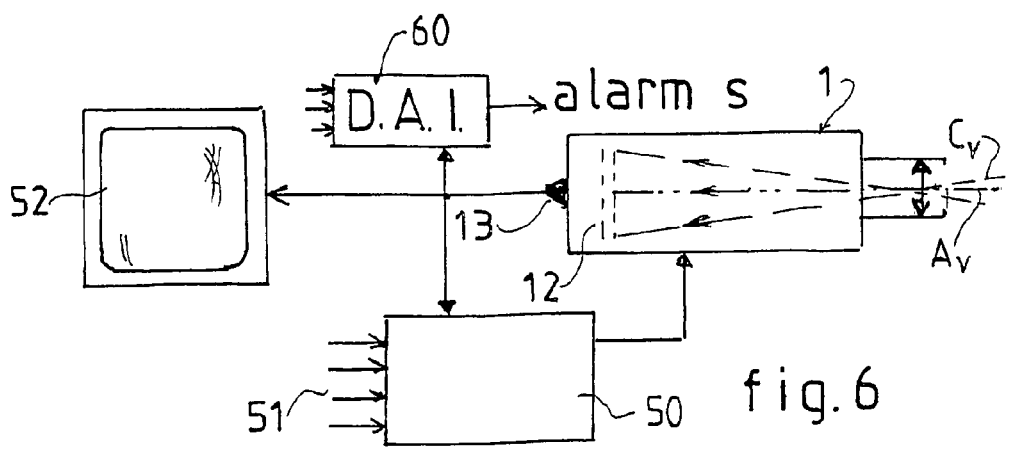
FIG. 6 is a block diagram of a device enabling the method of the invention to be implemented.

FIG. 6 is in highly diagrammatic form, showing the device enabling the method of the invention to be implemented.

It essentially comprises:

means for determining, in relatively stable first images obtained by the controllable camera 1, first portions corresponding to the preferred travel lanes of the objects;

means for determining in these first images, by a differential process, remaining second portions that are complementary to the first portions;

means for determining, in said remaining second portions, the reference position of an image point corresponding to a first stationary object point belonging to the environment, this first stationary object point having brightness different from that of the zone of the environment that surrounds it;

means for determining in at least one second image taken by the controllable camera after the first images, the vector that corresponds to the movement of the image point relative to its reference position as determined with the first images; and means for processing the second image output by the controllable camera as a function of the modulus and the direction of said vector so that, relative to the three-dimensional frame of reference associated with the environment, the image point returns to its reference position so that the second image remains stationary.

All of the above-specified means are constituted essentially by a computer type processor unit 50 having a programmable microprocessor or the like and including for this purpose a programming input 51 for loading with software for analyzing and processing purposes, which can be written by the person skilled in the art having knowledge of the description of the various steps of the method of the invention as given above.

The device may optionally be associated with a video screen 52 as mentioned above for visual use (by traffic operators) and for verification of the stability of the images obtained at the output from the camera 1 using the method of the invention.

The implementation of the method described above gives complete satisfaction compared with the cost of implementing it, in particular in terms of the quantity of processor and memory hardware.

Naturally, if necessary, the method could include, in addition to the steps described above, the following additional step for taking account in particular of camera rotation and of the "zoom" or scaling effect, as explained above.

Under such circumstances, the method further consists, in the first stage, in determining in the remaining second portions, the reference positions of two image points corresponding to first and second stationary object points belonging to the environment, these first and second stationary object points presenting brightness different from that of the zone of the environment that surrounds them, and in the second stage, in determining in the second image taken by the controllable camera after taking the first images, firstly the vector corresponding to the movement of at least one of the two image points, and secondly first and second parameters representing respectively the change in the distance between these two images points and the value of the angle between two straight lines passing through the two images points, respectively in the first images and in the second image, and in processing the second image output by the controllable camera as a function of the modulus and the direction of the vector and as a function of the first and second parameters so that compared with the three-dimensional frame of reference associated with the environment, both image points return to their reference positions.

The method of the invention as defined above can be implemented with a device as also described above. To do this, it suffices to load the processor unit 51 with different software for analysis and processing purposes that takes account of the additional step of the above-described method.

The method of the invention is particularly advantageous since it makes it possible, by stabilizing the images output by a controllable camera before applying them to an automatic image processor system 60 of the kind known under the reference DAI, to obtain better accuracy in detecting incidents while minimizing "false alarms" and avoiding measurement errors, and while also making it possible to achieve greater image compression in order to minimize costs and thus further improve the detection of incidents, accidents, etc.

The invention claimed is:

1. A method of stabilizing images obtained by a controllable video camera (1) of an environment that has a given three-dimensional frame of reference associated therewith and in which objects (4) can move on preferred lanes (5), the method comprising:

a first stage:

determining via a computer processor, in a stable first images (20) obtained by the controllable camera, first portions (21) that correspond to the preferred movement lanes (5) for said objects (4); then determining in said first images, by a differential process, remaining second portions (22) that are complementary to the first portions; and then determining, in said remaining second portions (22), the reference position of the image point ($P_i$) corresponding to a first stationary object point ($P_o$) belonging to said environment (3), said first stationary object point having brightness different from the brightness of the zone of the environment that surrounds it; and a second stage following the first:
  determining in at least one second image (30) taken by the controllable camera (1) after said first images (20), the vector ($V_d$) corresponding to the movement of said image point relative to its reference position determined with said first images; and
  in processing the second image (30) output by the controllable camera as a function of the modulus and the direction of said vector ($V_d$) in such a manner that relative to said three-dimensional frame of reference associated with the environment, said image point ($P_i$) returns to its reference position.

2. The method according to claim 1, further comprising:
in the first stage:
  determining, in the remaining second portions (22), the reference position of a second image point corresponding to a two second stationary object point belonging to the environment, the two stationary object points having brightness different from that of the zone of the environment that surrounds them; and
in the second stage following the first:
  determining in the second image (30) taken by the controllable camera after the first images, firstly the vector corresponding to the movement of at least one of the two image points, and secondly first and second parameters representing respectively the variation in the distance between these two images points and the value of the angle between the two straight lines passing through the two image points respectively in the first images and in the second image; and
  processing the second image output by the controllable camera as a function of the modulus and the direction of the vector and as a function of the first and second parameters so that relative to the three-dimensional frame of reference associated with the environment, both image points return to their reference positions.

3. The method according to claim 1, further comprising:
  selecting at least one of the first stationary object point and a second stationary object point to be situated on the horizon line of said environment.

4. The method according to claim 2, further comprising selecting at least one of the two stationary object points to be situated on the horizon line of said environment.

5. A device enabling stabilizing images obtained by a controllable video camera (1) of an environment that has a given three-dimensional frame of reference associated therewith and in which objects (4) can move on preferred lanes (5), the device comprising:
  a computer processor programmed to provide:
  means for determining, in stable first images (20) obtained by the controllable camera (1), first portions (21) corresponding to the preferred travel lanes (5) of the objects (4);
  means for determining in these first images (20), by a differential process, remaining second portions (22) that are complementary to the first portions;
  means for determining, in said remaining second portions (22), the reference position of an image point corresponding to a first stationary object point belonging to the environment, this first stationary object point having brightness different from that of the zone of the environment that surrounds it;
  means for determining in at least one second image (30) taken by the controllable camera (1) after the first images, the vector ($V_d$) that corresponds to the movement of the image point relative to its reference position as determined with the first images; and
  means for processing the second image (30) output by the controllable camera as a function of the modulus and the direction of said vector so that, relative to the three-dimensional frame of reference associated with the environment, the image point returns to its reference position so that the second image remains stationary.

* * * * *